Patented Jan. 27, 1931

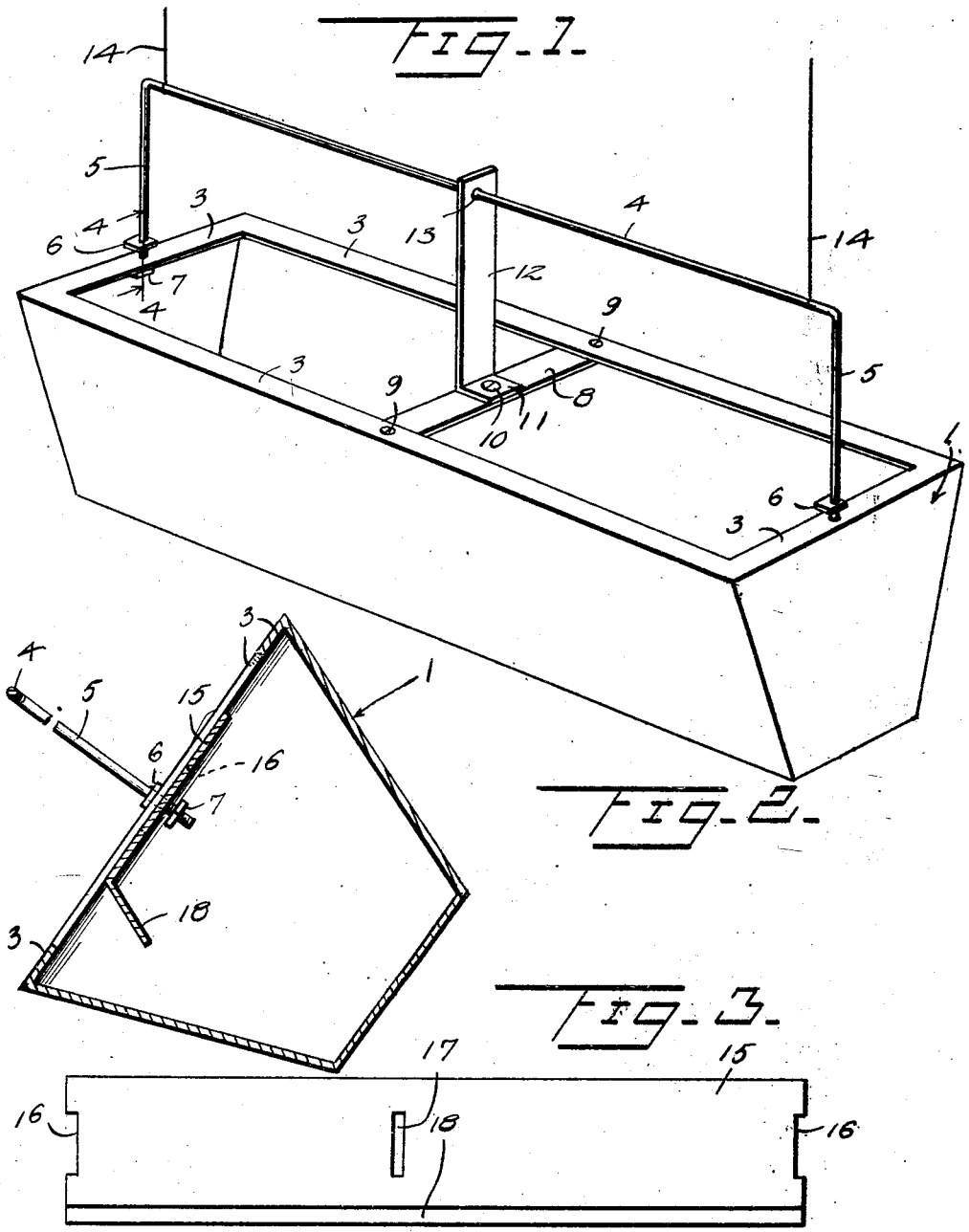

1,790,385

UNITED STATES PATENT OFFICE

PHILIP C. LORCHER, OF HURON, OHIO

POULTRY FEEDER

Application filed August 28, 1928. Serial No. 302,610.

This invention relates to animal husbandry and pertains particularly to a feeding device for poultry.

The primary object of the present invention is to provide an improved type of poultry feeder designed to be suspended above the ground so that the poultry will not readily go thereinto and thus foul the feed.

Another object of the invention is to provide a feed container having a guard flange about the mouth thereof designed to prevent wet feed or mash from being scattered or splashed from the container.

A still further object of the invention is to provide a feeder having a cover attachment for adapting the feeder for use by small chicks, the feed receptacle being arranged for this purpose upon one side and upon the ground or a suitable supporting structure.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a perspective view of the feed receptacle embodying a part of the present invention;

Figure 2 is a view in transverse section of the receptacle showing the top plate in position;

Figure 3 is a detailed plan view of the top plate;

Figure 4 is a sectional view taken upon the line 4—4 of Figure 1.

Referring to the drawing in detail, the numeral 1 indicates the feed container, the same being preferably constructed of metal and in the form of an elongated rectangular receptacle having the longitudinal walls 2 thereof inclined downwardly and inwardly, the end walls being substantially vertical when the receptacle is placed in upright position.

Formed about the top edge of the receptacle is an inwardly extending flange 3 which, besides acting to reinforce the structure, is designed to prevent the feed placed therein from being scattered, particularly when the receptacle is used for feeding small chicks in a manner to be hereinafter described.

Each of the flanges, which extends across the end of the receptacle, has an aperture formed therethrough intermediate the ends thereof for the reception of the threaded ends of an inverted substantially U-shaped bail or handle 4.

The ends of the side members 5 of this handle are threaded and inwardly of each end there is secured a stop 6 which limits the extension of the bail leg through the aperture of an end flange. When the bail is in position with the ends of the legs thereof each extended through a flange aperture a retaining nut 7 is threaded upon the inner end of each and brought to bear against the under face of the flange thereby securing the bail in upright position above the receptacle.

Extending transversely of the receptacle intermediate the ends thereof is a brace strip 8, each end being secured by a bolt or nut 9 to one of the longitudinal flanges 3 of the receptacle, while the central portion is apertured to receive a bolt 10 which is passed through the angularly extending foot portion 11 of an upright bail brace strip 12, this brace strip having an aperture 13 formed therethrough adjacent the upper end, through which the horizontal portion of the bail extends as shown in Figure 1.

When the receptacle structure thus far described is in use for feeding full grown poultry it is preferably suspended by attaching supporting wires or cords 14 to the bail 4 adjacent each end of the receptacle.

In order to adapt the feeder to use by small chicks, there is provided a guard plate 15 which is arranged longitudinally of the receptacle over the reinforcing strip 8 with the ends thereof extended beneath the end flanges 3 of the receptacle. This plate may be of light resilient material so that it can be flexed centrally to permit the insertion of the ends thereof to the positions described. The bail 4 may be retained in position when the plate 15 is used and if this is done then the nuts 7 are removed from the ends of the portions 5 so that these ends will be received within the recesses 16 formed at each end edge of the plate 15 in the manner shown. The nuts 7 are then replaced so that they will bear against the under face of the plate and hold it in the desired position. The central portion of the plate 15 is provided with a transverse slot 17 through which the holding bolt 10 of the brace bracket 12 is adapted to pass, this bracket, of course, being removed before attempting to insert the plate 15, the bolt thus serving to maintain the central portion of the plate in proper position upon the brace strip 8. Figure 2 shows the position which the plate 15 will assume when in use.

One longitudinal edge of the plate 15 is formed to provide the angular flange 18 which flange is positioned adjacent the inclined wall 2 of the receptacle when the cover plate is employed, the receptacle being positioned to rest upon this inclined wall or, in other words, upon its side so that the small chicks can reach feed within the receptacle across the longitudinal flange 3 which is adjacent this inclined wall. The flange 18 of the cover plate 15 extends inwardly and downwardly, as shown in Figure 2, and when the feeder is employed for small chicks.

While I have described the use of the cover plate 15 in association with the bail 4, it is of course obvious that it is not necessary that the bail be left in place when the plate 15 is used as suitable bolts may be employed to extend through the apertures in the flanges and the cross strip 8, to retain the plate in position.

The plate 15 is of materially less width than the receptacle 1 so that when the receptacle is used on its side the plate may be adjusted across the open face thereof to increase or decrease the space between the flange 18 and the adjacent flange 3 in accordance with the size of the chickens being fed.

From the foregoing description it will be readily seen that a feeder of the character herein described may be easily and economically constructed and will be found efficient in every detail for the proper feeding of young or full grown poultry.

Having thus described my invention what I claim is:—

1. A poultry feeder of the character described comprising an open top elongated receptacle, an inwardly extending guard flange secured to the open top of said receptacle, a bail for suspending said receptacle, said bail being secured at opposite ends thereof through said flange, a reinforcing strip extending transversely of the open top of the receptacle, an upright brace strip mounted on said reinforcing strip and engaging said bail at the upper end thereof, and a guard plate adjustably mounted on said flange and having a downwardly inclined edge portion.

2. A poultry feeder of the character described comprising an open top elongated receptacle, an inwardly extending guard flange secured to the open top of said receptacle, a bail for suspending said receptacle, said bail having stops at a point spaced upwardly from the lower ends thereof, a threaded nut for said bail, a reinforcing strip extending transversely of the open top of the receptacle, an upright brace strip mounted on said reinforcing strip and engaging said bail through the upper end thereof, and a guard plate adjustably mounted on said flange, said guard plate having transversely arranged recesses in the opposite ends thereof and a transverse recess substantially in the middle thereof, said end recesses being adapted to adjustably engage said bail between the stop and the guard flange, said transverse recess in the middle of the plate loosely engaging about said upright brace.

3. A poultry feeder of the character described comprising an open top elongated receptacle, an inwardly extending guard flange secured to the open top of said receptacle, a bail for suspending said receptacle, said bail having stops at a point spaced upwardly from the lower ends thereof, a threaded nut for said bail, a reinforcing strip extending transversely of the open top of the receptacle, an upright brace strip mounted on said reinforcing strip and engaging said bail through the upper end thereof, and a guard plate adjustably mounted on said flange, said stop limiting the insertion of the bail in the flange and cooperatively engaging said guard plate at the ends thereof whereby to hold the guard plate against vertical movement, said guard plate having transversely arranged recesses in the opposite ends thereof, a transverse recess substantially in the middle thereof, and a downwardly extending flange adapted to prevent animals from entering the receptacle.

In testimony whereof I hereunto affix my signature.

PHILIP C. LORCHER.